United States Patent [19]

Conte

[11] 4,315,976

[45] Feb. 16, 1982

[54] COATED ACTIVE ANODES

[75] Inventor: Alfred L. Conte, Cleveland, Ohio

[73] Assignee: Union Carbide Corporation, New York, N.Y.

[21] Appl. No.: 106,024

[22] Filed: Dec. 21, 1979

[51] Int. Cl.³ .................................................. H01M 6/14
[52] U.S. Cl. ...................................... 429/194; 429/209; 429/218
[58] Field of Search ............... 429/218, 194, 101, 105, 429/209, 48; 427/126.3, 126.4, 126.1, 180; 72/46

[56] References Cited

U.S. PATENT DOCUMENTS

| | | | |
|---|---|---|---|
| 3,928,075 | 12/1975 | Bass | 429/218 X |
| 4,069,375 | 1/1978 | Lanck | 429/218 |
| 4,085,256 | 4/1978 | Dey | 429/218 X |
| 4,093,784 | 6/1978 | Driscoll | 429/218 X |
| 4,142,028 | 2/1979 | Leger et al. | 429/194 |

*Primary Examiner*—Anthony Skapars
*Attorney, Agent, or Firm*—Cornelius F. O'Brien

[57] ABSTRACT

Active anodes, such as lithium, sodium and calcium, coated with an electrically nonconductive and chemically and electrochemically inert particulate material, such as talc, and a process for coating the anodes so as to facilitate the handling of the anodes prior to and during assembly into a cell.

13 Claims, No Drawings

COATED ACTIVE ANODES

FIELD OF THE INVENTION

The invention relates to active anode materials, such as lithium, sodium and calcium, coated with an electrically nonconductive and chemically and electrochemically inert particulate material and a process for producing them.

BACKGROUND OF THE INVENTION

The development of high energy cell systems requires the compatibility of an electrolyte possessing desirable electrochemical properties with highly active anode materials, such as lithium, calcium, sodium and the like, and the efficient use of high energy density cathode materials, such as $FeS_2$, $Co_3O_4$, $PbO_2$, oxyhalides and the like. One drawback in the manufacturing and assembling of these high energy cell systems is that the anodes, such as lithium, are usually soft, sticky material having a tendency to stick together when they are transported between areas for assembly into cells. In addition, anodes such as lithium have a tendency to accummulate static charge buildup during their transportation from the manufacturing facilities to the assembling facilities.

In the manufacture of soft, sticky strips of lithium, it has been proposed in the prior art, specfically U.S. Pat. No. 3,721,113, that thin continuous lithium strips can be produced by cold rolling lithium metal while it is compressed between smooth surfaces of a solid polymeric composition, which composition is nonreactive with lithium and has a critical surface tension of not over 46 dynes per centimeter at 20° C. The use of the polymeric sheet material is essential so as to prevent the sticking of the lithium to the metal surfaces of the roller. Once continuous lithium strips are produced another problem encountered is in the cutting of the lithium metal into a plurality of pieces which can be employed as lithium anodes in various types of cell systems. To overcome this problem it is disclosed in the prior art, specifically U.S. Pat. No. 4,060,017, that a flexible film, preferably of plastic, be interposed between the blade of a cutting device and a lithium strip such that when the blade is forced against the anvil with sufficient force to cut the lithium, the film prevents contact of the blade with the lithium. This will prevent any buildup of lithium being developed on the blade which would occur generally after only a few cutting operations. Although solutions in the prior art that have been proposed for the manufacture of a plurality of lithium electrodes from lithium strip material, one problem that still exists is in the transporting of the lithium electrodes from the manufacturing site to the assembly site where they will be assembled into a cell. Rectangular, square, circular or other shaped lithium electrodes are usually transported to the assembly station where they are then fed into automatic feeding machines and assembled into a cell container. It has been observed that during the transporting to and automatic feeding of the lithium anodes at the assembly station, there is a tendency for freshy cut lithium anodes to stick to themselves and to accummulate static charge whereupon the anodes then tend to stick to other surfaces resulting in a disruption of the assembly operation. This problem is most pronounced in employing lithium anodes for miniature type button cells in which the anodes can be as small as a square measuring 0.22 inch by 0.10 inch thick. An additional problem encountered during the transporting to and the feeding of lithium anodes at the assembly site is that there is a tendency for a coating of the lithium to build up on any metallic or plastic surface that they contact. In the manufacture of lithium strips, this tendency of the lithium buildup on metal surfaces was eliminated through the use of polymeric materials as described above in conjunction with U.S. Pat. No. 3,721,113 and to the use of flexible plstic film as discussed above in conjunction with U.S. Pat. No. 4,060,017. These solutions cannot be employed in the transporting of lithium anodes to the assembly site since the anodes are relatively small discrete bodies and any attempts to apply a plastic or polymeric material between the anodes would be time consuming, laborious and expensive.

One of the objects of this invention is to provide a coated active anode, such as a lithium that will retard static buildup and will not stick to metal and plastic surfaces as well as to other lithium anodes while being transported to an assembly site.

Another object of this invention is to provide a soft active anode with a coating of an electrically nonconductive and chemically and electrochemically inert particulate material.

Another object of this invention is to provide a method for producing active anode members, such as lithium, with a coating of an electrically nonconductive and chemically and electrochemically inert particulate material, such as talc, zinc oxide, alumina or lithium oxide.

Another object of this invention is to provide a lithium anode with a coating of an electrically nonconductive and chemically and electrochemically inert particulate material in an amount between about 0.1 milligram per square centimeter and about 8 milligrams per square centimeter.

The foregoing and additional objects will become more fully apparent from the following description.

SUMMARY OF THE INVENTION

The invention relates to a soft active anode coated on its surface with an electrically nonconductive and chemically and electrochemically inert particulate material in an amount between about 0.1 milligram per square centimeter and about 8 milligrams per square centimeter, preferably between about 0.3 milligram per square centimeter and about 4 milligrams per square centimeter, so as to retard static buildup and the tendency of the anode to stick to surfaces and other anodes prior to its assembly into a cell.

The invention is also directed to a method for preparing soft active anodes which can be handled without sticking together or to equipment prior to their assembly in a cell comprising the step of coating a plurality of soft active anode members with a substantially uniform layer of an electrically nonconductive and chemically and electrochemically inert particulate material in an amount between about 0.1 milligram per square centimeter and about 8 milligrams per square centimeter, preferably between about 0.3 milligram per square centimeter and about 4 milligrams per square centimeter.

Soft active anode members suitable for use in this invention can be selected from the group consisting of lithium, sodium, calcium and the like. It has been observed specifically in the manufacture and assembling of lithium anodes into cells, that the lithium has a tendency to build up static charge and to stick to metal and plastic surface. By coating the surface of the lithium anodes with a particulate material, such as talc, in the range specified above, it will effectively eliminate the static charge build up and serve as a blocking layer to prevent the lithium from sticking to other metal and plastic surfaces as well as to other lithium anodes.

The electrically nonconductive and chemically and electrochemically inert particulate material for use in this invention can be selected from the group consisting of talc, zinc oxide, alumina, lithium oxide, sodium oxide, calcium oxide and the like. As stated above, the particulate material should be coated on the surface of the anode in the range specified. An amount of the particulate material below 0.1 mg per sq. cm of the anode surface would be insufficient to adequately provide a protective blocking layer which could be utilized to prevent charge build up and eliminate the anode materials from sticking to other surfaces and to themselves. An amount of the particulate material above 8 mg per sq. cm of the anode surface would cover too much of the surface of the electrode while not providing any additional aid in preventing static build up and retarding or suppressing the stickiness of the anode members. The particle size of the particulate material can vary and preferably should be less than about 50 microns in size.

One of the preferred particulate materials for use in this invention is commercially available, finely ground talc. The term "talc" covers a wide range of natural minerals, most of which are high magnesium silicates. Basically talc is a soft mineral comprising a basic magnesium silicate that is usually whitish, greenish or grayish and has a slippery feel. Although there are wide varieties of commercially available talc, some of which contain minor amounts of impurities, they can be employed in the subject invention as long as the impurities contained are not deleterious to the active anode, such as lithium, or to the cell system in which the anode is to be used. The only criteria is that the talc be electrically nonconductive and chemically and electrochemically inert to the active anode. In addition, the particulate material should also be electrically nonconductive and chemically and electrochemically inert to the various other components of the cell system that it contacts when it is assembled into a cell system as the coating on the anode. For the purposes of this invention, talc shall include soapstone which is a talc-like material of various compositions and pyrophyllite which is the aluminum analog of talc having a theoretical composition of $Al_2SiO_4O_{10}(OH)_2$ while the theoretical composition of talc, an anhydrous magnesium silicate, is $Mg_3SiO_{10}(OH)_2$.

Although talc is preferred for use as a particulate material for coating an active anode, the oxides of lithium, sodium or calcium are also desirable since when they are employed in conjunction with lithium, sodium or calcium anodes, respectively, they will not be adding any foreign material to the anodes nor to the cell system employing the coated anodes. As stated above, it is essential that the coating material be chemically and electrochemically inert with the various components of the cell system it is intended to be employed with. Specifically, lithium oxide, due to its toxicity, should be handled with care, and it should not be employed in a chemically aggressive cell environment such as in oxyhalide cells.

In the employment of the coated anode materials of this invention in a lithium-FeS$_2$ cell system, the cell test results have shown that none of these materials cause any significant problem with respect to cell discharge or storage characteristics. Consequently, through the use of the subject invention, coated anodes can be produced and then continuously and automatically transported and fed through various commercial equipment and automatically assembled into cells at desirable production rates.

The following example is illustrative of the present invention and is not intended in any manner to be limited thereon.

EXAMPLE

Several lots of cells were constructed in which each cell employed a 0.037 gram lithium anode (measuring 0.226 inch long, 0.220 inch wide and 0.100 inch thick), a 0.207 gram cathode containing FeS$_2$, a polypropylene separator and 130 microliters of an electrolyte solution consisting of 1 M LiCF$_3$SO$_3$ in about 40 vol. % dioxolane, about 30 vol. % dimethoxyethane, about 30 vol. % 3-methyl-2-oxazolidone and a trace (about 0.1 vol. %) dimethylisoxazole. These components were assembled in a conductive metal housing and sealed with a conductive metal cap. Cell Lot A contained the shiny lithium anodes. Cell Lot B contained lithium anodes that were tumbled with commercial grade talc having the following chemical analysis: 61 to 62% SiO$_2$, 30 to 33% MgO, 0.8 to 1.2% Fe$_2$O$_3$, 0.1 to 3% CaO and about 0.5% moisture. Ninety-five percent of the talc particles measured 40 microns or less. The anodes contained about 0.3 mg talc per cm$^2$ of anode surface. Cell Lot C contained lithium anodes dusted with lithium oxide powder. Cell Lot D contained lithium anodes dusted with alumina (Al$_2$O$_3$) powder and Cell Lot E was dusted with zinc oxide powder. All of the powder materials were placed in a dry room to remove excessive moisture prior to being coated on the lithium anodes.

Several of the cells from each lot were discharged across a 15-ohm load to a 1.2 volt cutoff and the average discharge time recorded along with the average milliampere-hours calculated for each lot are shown in Table 1.

TABLE 1

| Cell Lot | Number of Cells | Hours (Average) | mAh (Average) |
|---|---|---|---|
| A | 3 | 1105 | 113 |
| B | 3 | 1158 | 118 |
| C | 3 | 1160 | 118 |
| D | 2 | 990 | 101 |
| E | 3 | 1115 | 114 |

Three cells in each lot were then stored at 71° C. for the time periods shown in Table 2 and the average decrease in height for each cell lot was measured and is also shown in Table 2.

TABLE 2

| Cell Lot | Height Change (inch) | | |
|---|---|---|---|
| | One Month | Two Months | Three Months |
| A | −0.002 | −0.002 | −0.003 |
| B | −0.002 | −0.002 | −0.003 |
| C | −0.002 | −0.002 | −0.003 |
| D | −0.001 | −0.002 | −0.003 |
| E | −0.001 | −0.002 | −0.002 |

Several cells from each of Cell Lots A, B and D were discharged at 35° C. across a 15-kilohm load to a 1.2 volt cutoff and the decrease (−) or increase (+) in the cell height of each cell was measured and is shown in Table 3.

TABLE 3

| Cell Lot | Height Change (inch) |
|---|---|
| A-cell 1 | +0.001 |
| A-cell 2 | −0.003 |
| A-cell 3 | −0.002 |
| B-cell 1 | −0.003 |
| B-cell 2 | −0.002 |
| B-cell 3 | −0.003 |
| C-cell 1 | −0.004 |
| C-cell 2 | +0.001 |

The data obtained from the above tests show that the coating of the lithium anodes with the various powders identified above did not cause any detrimental effect on the discharge or storage characteristics of the cells. It was observed that coated anodes did not stick to the surface of the equipment used to transport them to the assembly site, to the surface of the equipment employed in assembling the coated anodes into the cells or to themselves prior to assembly into the cells. This resulted in an efficient continuous automatic feeding of the anodes to the assembly site where they were then efficiently and automatically assembled into the cells.

What is claimed is:

1. An active anode member selected from the group consisting of lithium, sodium and calcium, coated on its surface with an electrically nonconductive and chemically and electrochemically inert particulate material in an amount between about 0.1 milligram per square centimeter and about 8 milligram per square centimeter.

2. The active anode member of claim 1 wherein the particulate material is in an amount between about 0.3 milligram per square centimeter and about 4 milligrams per square centimeter.

3. The active anode member of claim 1 wherein the particulate material is selected from the group consisting of talc, zinc oxide, alumina, lithium oxide, sodium oxide and calcium oxide.

4. The active anode member of claim 3 wherein the anode is lithium and the particulate material is selected from the group consisting of talc, zinc oxide, alumina and lithium oxide.

5. The active anode member of claim 3 wherein the anode is sodium and the particulate material is selected from the group consisting of talc, zinc oxide, alumina and sodium oxide.

6. The active anode member of claim 3 wherein the anode is calcium and the particulate material is selected from the group consisting of talc, zinc oxide, alumina and calcium oxide.

7. The active anode member of claim 3 wherein the anode is lithium and the particulate material is talc.

8. An electrochemical cell employing an active cathode material, an electrolyte and an active anode member coated with an electrically nonconductive and chemically and electrochemically inert particulate material in an amount between about 0.1 milligram per square centimeter and about 8 milligram per square centimeter.

9. The cell of claim 8 wherein the particulate material is in an amount between about 0.3 milligram per square centimeter and about 4 milligrams per square centimeter.

10. The cell of claim 8 wherein the anode is selected from the group consisting of lithium, sodium and calcium and the particulate material is selected from the group consisting of talc, zinc oxide, alumina, lithium oxide, sodium oxide and calcium oxide.

11. The cell of claim 8 wherein the anode is lithium and the particulate material is selected from the group consisting of talc, zinc oxide, alumina and lithium oxide.

12. The cell of claim 8 wherein the anode is sodium and the particulate material is selected from the group consisting of talc, zinc oxide, alumina and sodium oxide.

13. The cell of claim 8 wherein the anode is calcium and the particulate material is selected from the group consisting of talc, zinc oxide, alumina and calcium oxide.

* * * * *